Patented Jan. 21, 1947

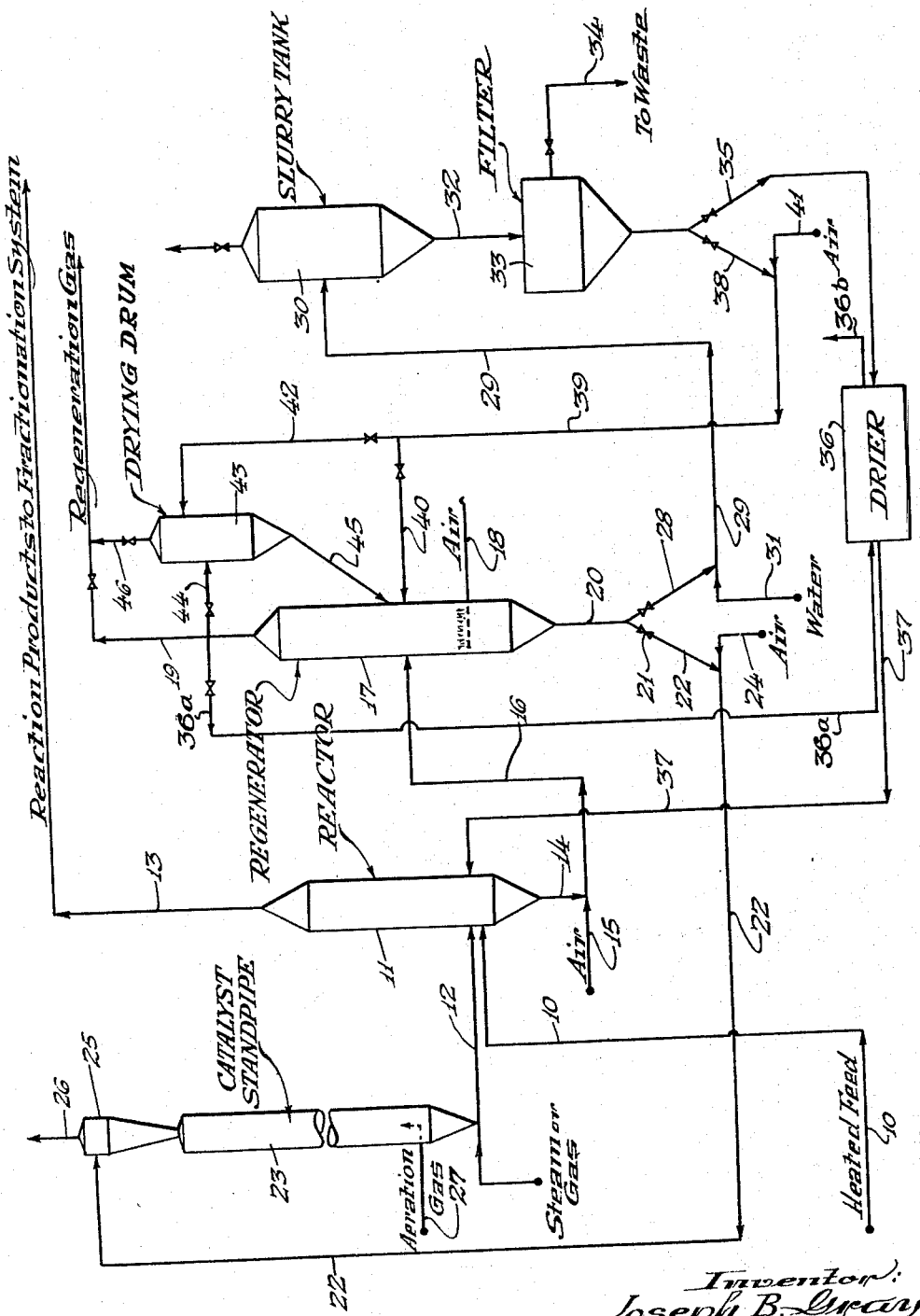

2,414,736

UNITED STATES PATENT OFFICE 2,414,736

CATALYTIC CONVERSION OF HEAVY OILS

Joseph B. Gray, Chicago, Ill., assignor to Standard Oil Company, Chicago, Ill., a corporation of Indiana Application June 26, 1942, Serial No. 448,533

11 Claims. (Cl. 196—52)

This invention relates to the conversion of hydrocarbons and particularly to the conversion of hydrocarbons into motor fuel of high knock rating by contacting with catalysts of the refractory metal oxide type. More particularly the invention relates to the conversion of heavy oils, such as crude oil, crude residuum and the like, into motor fuels by the action of catalysts wherein said heavy oils are contaminated by mineral salts. Still more particularly the invention relates to the conversion of salt-contaminated heavy hydrocarbon oils with powdered catalysts in a recycling system wherein the catalyst is continuously regenerated and recycled in the process.

A principal object of the invention is to effect the conversion of salt-contaminated heavy oils by the action of refractory solid catalysts in a manner to avoid permanent deactivation of the catalyst by the salt in the oil. Another object of the invention is to convert salt-contaminated heavy oils into motor fuels by contacting with refractory metal oxide catalysts, without the necessity of removing the salt from the oil prior to contacting with the catalyst. Other objects of the invention will become apparent from the description which follows:

The invention is illustrated by a drawing which shows in schematic form an apparatus for carrying out the process.

In the conversion of hydrocarbon oils with metal oxide catalysts and particularly activated metal oxides of the type of silica, alumina, magnesia, etc., alone or in combination with each other or with other metal oxides such as thoria, zirconia, titania, chromia, molybdena, etc., the alkali metal salts have been found to be objectionable for the reason that their presence in the catalyst greatly decreases the overall or total life of the catalyst. By "total life" it is intended to distinguish from "cycle life" which is the life of the catalyst in a single reaction period between reactivations. Thus catalyst activity may be temporarily diminished by accumulations of carbon which are readily removed by combustion in a regeneration operation, whereas permanent deactivation of the catalyst caused by contamination with salt or by other factors cannot be corrected by simple regeneration as commonly practiced in the art.

In processing crude petroleum oils or crude petroleum residuums one frequently encounters the problem of catalyst deactivation by the salts contained in the feed stock. These salts consist principally of the chlorides and sulfates of the alkali metals, especially sodium and potassium and also the alkaline earth metals particularly magnesium and calcium. The amount of salts contained in the crude oil will normally be in the range of about 25 to 100 pounds per thousand barrels of oil. Although this amount is relatively small when expressed in percentage, I have discovered that there is a cumulative effect of the salt on the catalyst, due principally to the reuse or recycle of the catalyst in the operation. The effect is especially noticeable where catalyst losses are small and catalyst life is long such as in the case of the highly activated clays, bentonites, montmorillonite, etc., and the synthetic catalysts prepared from silica gel, active alumina, active magnesia, etc. Thus where catalyst life is short and the normal rate of discarding catalyst is high, the cumulative effect of salt on catalyst is of lesser importance. Where the catalyst losses are small, however, for example, 0.1 to 1 percent of catalyst circulated, the harmful effect of contaminating salts on catalyst activity becomes quite important.

Various methods have been proposed for dealing with the salt contamination problem, including distillation or coking of the oil prior to catalytic cracking and washing the salt from the oil with the aid of various desalting agents, electrical precipitation, etc. All of these methods of salt removal, however, are relatively costly and washing methods in general do not remove all of the salt. I have now discovered that removal of the salt before contacting with the catalyst can be avoided by removing the salt from a portion of the catalyst continuously during the conversion operation and recycling of the catalyst in the process. I have discovered that if the accumulation of salt on the catalyst is kept below a critical point of salt tolerance, permanent deactivation of the catalyst does not take place. Stated in another way, metal oxide cracking catalysts will tolerate a limited concentration of salts occurring in crude petroleum, the practical limit of such toleration being about 0.5 to 1% based on the weight of the catalyst.

Based on this discovery I have devised an economical process for removing contaminating salt from the catalyst in such a manner as to maintain the concentration of salt on the catalyst at a point substantially below the maximum tolerance, about 1% more or less depending on the character of the salt encountered and the nature of the catalyst employed. My process will be clearly understood from a consideration of the accompanying drawing.

Referring to the drawing, salt-containing crude petroleum residuum, heated and preferably in a partially vaporized condition, is charged to the process by line 10 leading to catalytic reactor 11 into which the oil is sprayed. Catalyst is charged in a flowing stream by line 12 and contact between catalyst and oil is effected in the reactor by maintaining the catalyst in a suspended condition. The upward vapor velocity in the reactor is maintained at a point at which the dense phase of suspended catalyst will form, the density of this phase being about 5 to 25 pounds per cubic foot. Above the dense phase a dilute phase generally exists in the top of the reactor in which the catalyst concentration is quite low or negligible. The temperature of the reactor is maintained in the conversion temperature range of about 850 to 1150° F., generally about 925 to 950° F. The reaction products are conducted by line 13 to a fractionating system (not shown) wherein the desired gasoline fraction is recovered.

The stream of suspended catalyst is withdrawn from the reactor by line 14 and carried by air or an inert gas admitted at 15 thru line 16 to regenerator 17 wherein regeneration is effected by contacting the deactivated catalyst with oxygen or air. Air for this purpose is admitted by line 18. Carbonaceous matter deposited on the catalyst is consumed by the oxidation reaction, the gaseous combustion products being discharged from the regenerator by line 19. A dense phase suspension of catalyst and regeneration gases is maintained in 17 and regenerated catalyst is continuously or intermittently withdrawn by line 20, the principal stream flowing thru valve 21 and line 22 to catalyst standpipe 23. The catalyst may be conveyed thru line 22 by air or other gas introduced at 24. Carrier gas introduced in this manner may be separated by cyclone separator 25, the gas being vented thru 26 and the catalyst dropping into standpipe 23.

The standpipe 23 is maintained substantially full of catalyst and kept in flowing condition by aeration gas, for example, flue gas, hydrocarbon gas, etc. introduced at 27. The regenerated catalyst still hot from the regenerator is then carried back to reactor 11 thru line 12 as hereinbefore described. A suitable carrier gas or other device may be employed to convey the catalyst at the desired rate from standpipe 23 thru line 12. The rate of feeding catalyst should be so controlled to maintain the desired catalyst-to-oil ratio fed to the reactor. A catalyst-to-oil ratio of about 1–10 parts of catalyst per part of oil is usually desired, a ratio of 2–5 being commonly employed.

In carrying out the regeneration, it is important to maintain the temperature to prevent excessive heating of the catalyst which has the effect of permanently impairing catalyst activity. Regeneration temperatures of 950 to 1200° F. are generally satisfactory, the temperature varying considerably with the nature of the catalyst. The regeneration reaction is exothermic and various means may be employed for removing the heat of regeneration, for example, indirect cooling may be employed in regenerator 17 or cooled, regenerated catalyst may be recycled to the regenerator to absorb part of the heat of regeneration. On regeneration, any volatilizable salts deposited on the catalyst along with the carbon from the petroleum feed stock are eliminated with the spent regeneration gases thru 19. Non-volatile salts such as sodium chloride, however, remain deposited on the catalyst and are recycled with the catalyst back to the reactor as hereinabove described.

In order to prevent excessive accumulations of salts, an aliquot portion of the regenerated catalyst is withdrawn or by-passed by line 28 and line 29 to drum 30, the catalyst being conducted preferably in water slurry, the water for the purpose being introduced by line 31. Water for this purpose is preferably distilled water such as steam engine condensate or it may be softened water having a low concentration of total solids. If cold water is used, the heat of the catalyst will be sufficient to heat it to near boiling, thus increasing the rate of solution of the contaminating salts from the catalyst. By the term "aliquot portion" I mean a portion of the regenerated catalyst having substantially the same composition, i. e. the same ratio of particle size, etc., as the whole.

The hot slurry of water and catalyst in tank 30 is conducted by line 32 to filter 33, which is preferably of the continuous rotary type. The catalyst may be washed on the filter by additional distilled water and, if desired, the washings from the filter may be segregated and employed as make-up water at 31. Filtrate containing salts removed from the catalyst is discarded from the system by line 34.

Washed catalyst is conducted by line 35 thru drier 36 thence by line 37 to reactor 11. In drier 36 the catalyst may be dried by hot regeneration gases withdrawn from discharge line 19 through line 36a and discarded by vent 36b, if desired. Also, if desired, the washed catalyst may be mixed, wet or dry, with liquid feed stock and heated in a pipe heater before introducing into reactor 11.

Instead of drying the catalyst from 33 and returning it to the reactor 11, I may alternatively conduct the washed catalyst by lines 38, 39 and 40 back to the regenerator 17. For this purpose the catalyst may be either wet, dried or partially dried. A current of air or other suitable carrier gas may be introduced at 41. Also, instead of returning the washed catalyst to the regenerator 17 directly, it may be conducted by line 42 through drying drum 43 wherein it is contacted with hot regeneration gases withdrawn from 19 by line 44, the washed and dried catalyst being returned to the regenerator by line 45. Water vapor and regeneration gases employed for the purpose are discharged from 43 by line 46.

As hereinabove indicated, the proportion of regenerated catalyst which may be washed depends upon several factors, the most important being the amount of salt in the feed stock, the ratio of catalyst to feed stock charged to reactor 11, and the salt tolerance of the particular catalyst employed. For example, when contacting a typical Mid-Continent crude residuum containing 40 pounds of salt per thousand barrels with an acid-treated montmorillonite catalyst known as "Super Filtrol," and employing a catalyst-to-oil ratio of 1, it is only necessary to wash about 1.3% of the regenerated catalyst to keep the salt concentration on the catalyst below 1%. In general, it will be desirable to wash about 0.5 to 10% of the regenerated catalyst being recycled in the system.

Instead of washing the catalyst with water as hereinabove described, I may also employ aqueous solutions for this purpose to facilitate the removal of salt from the catalyst. Thus I may employ water acidulated with hydrochloric acid, oxalic acid, or other mineral or organic acid. I may also employ dilute solutions of certain salts for their effect in base exchanging with the alkali metals adsorbed on the catalyst. Aluminum or magnesium chlorides or sulfates may be suitably employed in this way. After the base-exchange treatment the catalyst is preferably washed with distilled water before returning to the system.

On returning washed catalyst to the regenerator, either wet or dried, the cooling effect of the returned catalyst assists in controlling the temperature of the regenerator and thus added advantage is obtained by this method of operation. Numerous advantages result from washing the catalyst after regeneration, among them being the following: Any volatile salts remaining on the catalyst are driven off in the regenerator thereby reducing the amount of washing necessary. The salts are more completely removed from the catalyst after regeneration than before regeneration, apparently because of the chemical changes effected in the salts and the catalyst by the oxidizing conditions in the regenerator. The carbon and carbonaceous substances, having been largely removed in the regenerator, do not interfere with the washing operation.

The scope of my invention is defined by the following claims.

I claim:

1. In the process of converting salt-contaminated heavy hydrocarbon oils by the action of solid, finely divided refractory catalysts in a system wherein the catalyst is suspended in the oil vapors undergoing conversion and continuously recycled from a reaction zone to a regeneration zone and back to said reaction zone into contact with said heavy oils, the improvement comprising withdrawing a minor aliquot proportion of the regenerated catalyst from said regeneration zone, washing it with water to remove contaminating salts therefrom, and returning it to the conversion system.

2. The process of claim 1 wherein the proportion of catalyst withdrawn and washed is about 0.5 to 10% of the amount of regenerated catalyst recycled in the system.

3. In the process of claim 1 wherein the washed regenerated catalyst is returned to the regenerator thereby assisting in controlling the temperature of the regenerator.

4. The process of claim 1 wherein the washed regenerated catalyst is returned to the reaction zone.

5. The process of claim 1 wherein the washed regenerated catalyst is dried with the aid of spent regeneration gases and thereafter returned to the reaction zone.

6. The process of cracking salt-contaminated residual oils wherein a residual oil is contacted at conversion temperatures in a reaction zone with a suspended powdered solid refractory metal oxide catalyst, whereby said heavy oils are converted into lighter products including gasoline, and said catalyst is contaminated with carbonaceous deposits and salt, contaminated catalyst is transferred to a regeneration zone and therein contacted with oxidizing gases at regeneration temperatures, thereby effecting the combustion and removal of carbonaceous matter from said catalyst and the restoration of catalyst activity, and the regenerated catalyst is recycled to said reaction zone, the improvement comprising withdrawing a minor aliquot proportion of the regenerated catalyst being recycled, washing contaminating salts therefrom and returning the washed catalyst to the main body of catalyst in the conversion system.

7. The process of claim 6 wherein the proportion of catalyst withdrawn for washing is about 0.5 to 10% of the regenerated catalyst being recycled.

8. The process of claim 6 wherein the proportion of catalyst washed is sufficient to maintain the average concentration of salt on the catalyst in the system less than about 1%.

9. The process of claim 6 wherein the washed regenerated catalyst is returned to the regeneration zone.

10. A process for cracking heavy residual petroleum oil containing constituents unvaporizable without decomposition and inorganic impurities, which comprises contacting said oil while at least a portion of the same is in the liquid state with finely divided active catalytic material in a cracking zone at cracking temperature to cause cracking of said oil, continuously withdrawing a stream of said catalytic material containing combustible deposits and inorganic impurities from the cracking zone, regenerating the finely divided catalyst so withdrawn with an oxidizing gas in a regenerating zone to remove the combustible deposits therefrom, continuously returning the stream of hot regenerated catalyst to the said cracking zone, and treating a portion of the catalyst being circulated through the cracking and renegerating zone with a dilute inorganic acid to remove inorganic impurities formed on said catalyst during the cracking treatment.

11. A process for cracking heavy residual petroleum oil containing constituents unvaporizable without decomposition and inorganic impurities, which comprises contacting said oil while at least a portion of the same is in the liquid state with finely divided active catalytic material in a cracking zone at cracking temperature to cause cracking of said oil, continuously withdrawing a stream of said catalytic material containing combustible deposits and inorganic impurities from the cracking zone, regenerating the finely divided catalyst so withdrawn with an oxidizing gas in a regenerating zone to remove the combustible deposits therefrom, continuously returning the stream of hot regenerated catalyst to the said cracking zone, and treating a portion of the catalyst being circulated through the cracking and regenerating zone with an aqueous wash liquid in which said inorganic impurities are soluble to remove inorganic impurities formed on said catalyst during the cracking treatment.

JOSEPH B. GRAY.